United States Patent
Miesak

(10) Patent No.: US 9,099,837 B2
(45) Date of Patent: Aug. 4, 2015

(54) OPTICALLY LOCKED HIGH ENERGY OPA-OPA

(75) Inventor: Edward J. Miesak, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/976,722

(22) PCT Filed: Dec. 28, 2011

(86) PCT No.: PCT/US2011/067566
§ 371 (c)(1),
(2), (4) Date: Jun. 27, 2013

(87) PCT Pub. No.: WO2012/092362
PCT Pub. Date: Jul. 5, 2012

(65) Prior Publication Data
US 2013/0279528 A1    Oct. 24, 2013

Related U.S. Application Data

(60) Provisional application No. 61/428,368, filed on Dec. 30, 2010.

(51) Int. Cl.
*H01S 3/10* (2006.01)
*G02F 1/39* (2006.01)
(Continued)

(52) U.S. Cl.
CPC .............. *H01S 3/10007* (2013.01); *G02F 1/39* (2013.01); *G02F 2001/392* (2013.01); *H01S 3/005* (2013.01); *H01S 3/0092* (2013.01); *H01S 3/2383* (2013.01)

(58) Field of Classification Search
CPC ..... G02F 1/39; G02F 2001/392; H01S 3/005; H01S 3/0092; H01S 3/1007; H01S 3/2383
USPC .......................................... 359/330, 333, 340
See application file for complete search history.

(56) References Cited

U.S. PATENT DOCUMENTS

2003/0137719 A1*  7/2003  Van Der Veer ................. 359/330
2004/0012841 A1   1/2004  McCarthy
(Continued)

FOREIGN PATENT DOCUMENTS

| CN | 1579976 A | 2/2005 |
|----|-----------|--------|
| CN | 101416106 A | 4/2009 |
| WO | 2005094275 A2 | 10/2005 |

OTHER PUBLICATIONS

International Preliminary Report on Patentability for PCT/US2011/067566 mailed Jul. 11, 2013, 9 pages.

(Continued)

*Primary Examiner* — Eric Bolda
(74) *Attorney, Agent, or Firm* — Withrow & Terranova, PLLC

(57) ABSTRACT

Systems and methods for producing high-energy, pico-second laser pulses are disclosed. Systems and methods include using a modelocked laser source to drive an OPO (optical parametric oscillator) and an OPA (optical parametric amplifier) such that the OPA and OPO self-synchronize without the use of separate synchronization components and produce high-energy output without requiring pulse stretchers or pulse compressors, making the laser system viable for portability and vehicle mounting from both cost and durability standpoints.

16 Claims, 5 Drawing Sheets

(51) Int. Cl.
 *H01S 3/23* (2006.01)
 *H01S 3/00* (2006.01)

(56) References Cited

U.S. PATENT DOCUMENTS

2005/0213619 A1* 9/2005 McCarthy et al. .............. 372/21
2007/0268940 A1 11/2007 Luo et al.
2010/0328761 A1* 12/2010 Reid et al. ..................... 359/330

OTHER PUBLICATIONS

International Search Report for PCT/US2011/067566, mailed Aug. 31, 2012.
First Office Action for Chinese Patent Application No. 201180068573.2, issued Nov. 24, 2014, 11 pages.
Notice of Rejection for Japanese Patent Application No. 2013-547645, mailed Apr. 7, 2015, 11 pages.

* cited by examiner

OPTICALLY LOCKED HIGH ENERGY OPA-OPA

PRIORITY

This application is a 35 U.S.C. 371 national phase filing of International Application No. PCT/US2011/067566, filed on Dec. 28, 2011, which claims priority under 35 U.S.C. §119(e) from U.S. Provisional Application No. 61/428,368 filed on Dec. 30, 2010, the disclosures of which are hereby incorporated herein by reference in their entireties.

OVERVIEW

The present document pertains to a robust, compact, high energy source of laser pulses. It is rugged enough that it can be reliably used on moving platforms and can be built compactly.

BACKGROUND

High energy picosecond-class lasers at wavelengths where energy storage materials don't exist commonly rely on optical parametric amplification (OPA). Parametric gain is an instantaneous process, it exists only when the pump pulse is present. This requires that the signal pulse to be amplified is well synchronized with the pump pulse. Any temporal jitter between the signal and pump is translated into amplitude and spectral shifts (jitter). One design option to ease the difficulty of temporal synchronization is to stretch the signal pulse to the nanosecond regime and use a nanosecond class pump laser.

Pulse stretchers and compressors, however, come with their own particular difficulties. Traditional pulse stretchers and compressors are very large devices having many small components with alignment tolerances on the scale of sub-millimeters. A small pulse stretcher may require up to 8 cubic feet of volume. A pulse stretcher suitable for high-energy, picosecond-class pulses would be even larger. Furthermore, because tolerances for a pulse stretcher are comparable to those for an interferometer, and because alignment requirements are on a scale of sub-millimeters throughout the device, a pulse stretcher is a large, cumbersome, expensive device that is highly sensitive to vibration, dust, and any other potential source of disturbance. It is difficult to configure and keep stable in a lab setting and utterly unfit for use in any kind of field or mobile environment.

A typical pulse compressor is similar to a typical pulse stretcher in terms of overall volume, components, tolerances, alignment requirements, high cost, low efficiency, and general unsuitability for use in anything other than a lab setting.

The gain coefficient of an optical parametric amplifier (OPA) is directly related to the pump pulse intensity. Using short pump pulses has the advantage of increased intensity as well as increasing the mixing crystal damage threshold (damage threshold flux increases approximately as the square root of the pulse width). It is therefore desirable to use a picosecond class laser as the pump. But, as noted previously, this makes the temporal synchronization an extremely difficult task because at such pulsewidths the system jitter is much larger than the width of a single laser pulse.

Past work on using nanosecond lasers to pump OPAs relied on electronically synchronizing the nanosecond laser to a master oscillator either optically or electronically. Precision electronic delay boxes were used to over-lap the signal and pump pulses inside the mixing crystals. This technique can be used when the laser pulses are in the multiple nanosecond time regime. A seeded nanosecond laser itself has a timing jitter on the order of a nanosecond. However, for a picosecond-class laser, the timing jitter will be on the order of 100 or so ps or less. At such tolerances and durations, electronic delay boxes and similar devices are simply not fast enough to be effective.

Furthermore, with mobile or field applications in mind, pulse stretchers and pulse compressors should preferably be omitted as they do not contribute to the reliability or stability of a laser system. It would therefore be an advance in the art to create a laser system capable of being synchronized without the use of pulse stretching/compression or electronic delay components.

SUMMARY

Some variations of the systems and methods discussed herein pertain to an optically locked high-energy self-synchronizing laser amplification system, the system comprising: a modelocked laser source; an optical parametric oscillator (OPO), where said oscillator is driven by a pulse sequence from said pump laser source; and an optical parametric amplifier (OPA); wherein a timing of said pulse sequence is based on a size of the OPA optical cavity; and wherein the OPA is driven by at least a portion of the pulse sequence, thereby causing the OPO and OPA to self-synchronize.

In some variations, the OPA includes a first OPA serially disposed and optically connected with a second OPA. In further variations, the pump laser source is a pico-second laser. In yet further variations, the OPA is a double-pass OPA.

In some variations, the system further comprises a first feedback loop that includes: a first optical isolator disposed in an optical path between the pump source and the OPO; at least one mirror disposed in an optical path between the OPO and said OPA; a second optical isolator disposed in an optical path between said mirror and said first optical isolator; and a first laser amplifier disposed in an optical path between said first optical isolator and said second optical isolator. In other variations, the system further comprises a second feedback look that includes: at least a second mirror disposed in an optical path between the first OPA and the second OPA; a third optical isolator disposed in an optical path between said second mirror and the first optical isolator; and a second laser amplifier disposed in an optical path between said first optical isolator and said third optical isolator.

In some variations, the system further comprises a first pulse picker disposed in an optical path between the laser source and the OPO; a first beam splitter disposed in an optical path between the first pulse picker and the OPO; a first laser amplifier in optical communication with the first beam splitter; and a first optical isolator disposed in an optical path between the first laser amplifier and the OPA. In other variations, the system further comprises a second pulse picker disposed in an optical path between the first beam splitter and the OPO; a second beam splitter disposed in an optical path between the second pulse picker and the OPO; a second laser amplifier in optical communication with the second beam splitter; and a second optical isolator disposed in an optical path between the second laser amplifier and a the second OPA.

In some variations, at least one optical isolator includes a faraday isolator. In other variations, at least one pulse picker includes a Pockels cell. In yet other variations, the pump laser source is an Nd:YAG pico-second laser. In further variations, the OPO is a tunable, synchronously-pumped OPO. In yet further variations, at least one laser amplifier is an Nd:YAG amplifier. In further variations still, the system includes a ruggedized housing enclosing the optical components, the housing being configured to protect the optical components from mis-alignment, vibration, and external contaminants and also for mounting on a vehicle.

Other variations of techniques and systems discussed herein may pertain to a method of generating a high-energy, mid-wave, ultra-short laser pulse, the method comprising: providing a pulse sequence from a modelocked pump laser source; driving an optical parametric oscillator (OPO) with a first portion of the pulse sequence; driving an optical parametric amplifier (OPA) with a second portion of the pulse sequence such that the OPA and the OPA self-synchronize; and amplifying at least one pulse from the pulse sequence with the driven OPA into an ultra-short laser output pulse; where the pulse sequence is based on an optical cavity size of the OPA.

In some method variations, driving the OPO includes: first isolating the pulse sequence with a first isolator disposed in an optical path between said pump laser source and said OPO; first capturing at least part of an output of the OPO in an optical path between said OPO and said OPA; second isolating said first captured output; first amplifying said second isolated output; and introducing said first amplified output into an optical path between said laser source and said first isolator.

In further method variations, the OPA includes at least two serially-connected double-pass OPAs and the step of driving at least one OPA includes: second capturing at least part of an output of the first OPA in an optical path between the first OPA and the second OPA; third isolating the second captured output; second amplifying said third isolated output; and introducing said second amplified output into an optical path between said laser source and said first faraday isolator.

Other variations of techniques and systems discussed herein may pertain to an optically locked high-energy self-synchronizing laser amplification system, the system comprising: a modelocked laser source; a first Pockels cell in optical communication with the modelocked laser source; a first beam splitter in optical communication with the first Pockels cell, such that the first Pockels cell is disposed in an optical path between the beam splitter and the modelocked laser source; a second Pockels cell in optical communication with the first beam splitter such that the first beam splitter is disposed in an optical path between the first and second Pockels cells; a second beam splitter in optical communication with the second Pockels cell such that the second Pockels cell is disposed in an optical path between the first and second beam splitters; a tunable optical parametric oscillator (OPO) in optical communication with the second beam splitter such that the second beam splitter is disposed in an optical path between the second Pockels cell and the OPO; a first laser amplifier in optical communication with the first beam splitter such that the first beam splitter is disposed in an optical path between the first laser amplifier and the first Pockels cell; a first Faraday isolator in optical communication with the first laser amplifier such that the first laser amplifier is disposed in an optical path between the first beam splitter and the first Faraday isolator; a second laser amplifier in optical communication with the second beam splitter such that the second beam splitter is disposed in an optical path between the second laser amplifier and the second Pockels cell; a second Faraday isolator in optical communication with the second laser amplifier such that the second laser amplifier is disposed in an optical path between the second beam splitter and the second Faraday isolator; a first optical parametric amplifier (OPA) in optical communication with the OPO and the first Faraday isolator such that the OPO is disposed in an optical path between the second beam splitter and the first OPA and such that the first Faraday isolator is disposed in an optical path between the first OPA and the first laser amplifier; and a second OPA in optical communication with the first OPA and the second Faraday isolator such that the first OPA is disposed in an optical path between the OPO and the second OPA and such that the second Faraday isolator is disposed in an optical path between the second OPA and the second laser amplifier.

In some such variations, at least one OPA is a multiple-pass OPA. In other variations, the modelocked laser source generates pulses having a length of between 5 and 8 pico-seconds, inclusive. In yet other variations, the OPO is tunable over 2.5 to 4 microns. In other variations still, the first and second laser amplifiers are Nd:YAG amplifiers.

In some such variations the system further comprises a light-proof housing enclosing the optical components, the housing being configured to protect the optical components from mis-alignment, vibration, dust and external contaminants and also for mounting on a vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein a.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Some variations of laser systems discussed herein relate to high energy pico-second and sub-pico-second laser pulses in the mid wave. Variations also relate to robust lasers that can be built and configured to operate from moving platforms and other field environments. Concerns for such laser systems include weight, cost, sensitivity to vibration, sensitivity to dust, component reliability, and signal synchronization.

One variation of a laser system discussed herein pertains to temporal synchronization of the pump and seed/idler pulses. Synchronization becomes more difficult when trying to use electronic means to synchronize the system as the pulse width of the system approaches the temporal jitter of the system. Some variations of synchronized laser system use sub 10 ps pump pulses, which cannot be synchronized electronically to the amplifiers because the system jitter is an order of magnitude longer than the pump pulse width. This means that the electronic components are neither fast nor sensitive enough to detect and respond to the pulse in time to be effective.

Variations of the systems described herein compensate for or eliminate timing jitter by using a mode-locked laser train of pulses to provide energy and synchronization to a mode matched optical parametric oscillator (OPO) feeding an OPA or an OPA chain. A mode-locked train of pulses is a group of pulses exiting a laser oscillator spaced at the round-trip time of the laser cavity Mode locking of a pump laser may be accomplished in several ways, including active or passive mode-locking.

In some variations, passive mode-locking may be preferred because the desired pulse durations may be too short to achieve by driving a modulator with an electric signal. Passive mode-locking may be accomplished in some cases with a saturable absorber such as a dye cell, but in some cases doped crystals, semiconductors, and nonlinear optical effects (such as Kerr-lens mode-locking) may be employed.

In one variation of pulse synchronization, there may be more than 80 pulses in one train. The first 60 or so can be used to synchronously drive the mode matched OPO. The subsequent pulses may then be amplified and used to drive one or more follow-on OPAs. Since all the pump pulses used come from the same train of pulses they are critically synchronized. Timing jitter for this system therefore becomes a non-issue.

Figure 1:
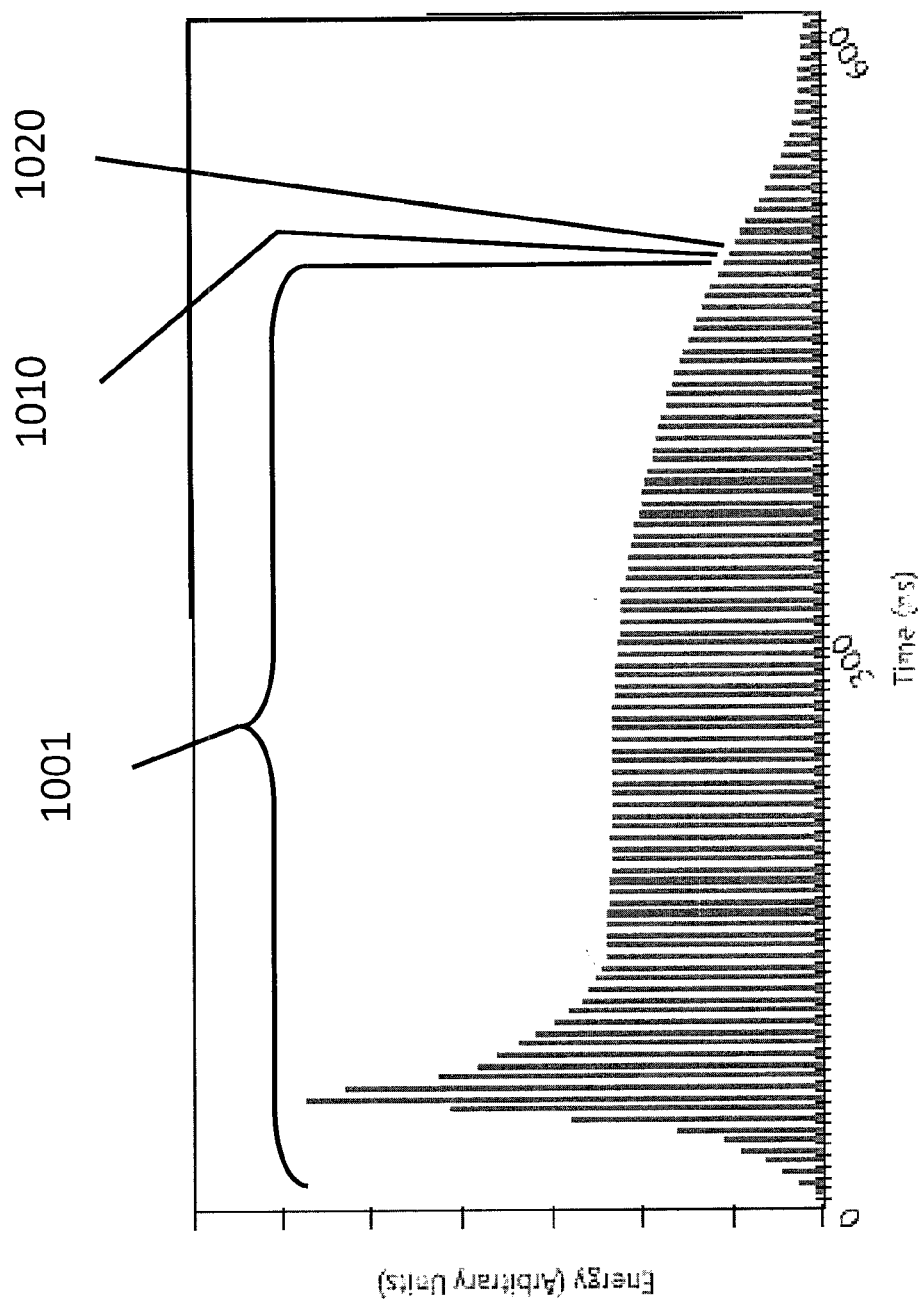
FIG. 1 shows a pulse sequence generated by a pico-second laser according to an aspect of the present invention.

An example of a mode-locked pulse train is shown in FIG. 1. In the example shown, many pulses exit the laser, each at a precise time interval determined by the laser cavity. The first 60 or so pulses 1001 may be used to drive an OPO which produces a short pulse 1010 (preferably fps or less) at the wavelength of interest. The subsequent one 1010 or more pulses 1020 in the train may then be amplified and used to drive one or more OPAs which follow the OPO. Since every pulse in the mode locked train is precisely timed with respect to every other pulse in the train, the OPA(s) is/are precisely timed with the output of the OPO. An appropriately selected or configured optical delay line (or lines) between the components may then be applied to over-lap the pulse inside the mixing crystals. In some variations, even the pump laser jitter is cancelled by such an approach.

In other variations, more or fewer pules may be used to drive an OPO depending on the wavelength of interest. In some variations, a pulse train may only have fifty or fewer pulses. In such variations, some or all of the pulses going into the oscillator may be re-used. In such variations, a pulse train may be fed to an oscillator and then passed through a shutter upon exiting the oscillator. The shutter, which may be a Pockels cell, may then be used to select an appropriate pulse to send through a desired amplification chain. In other variations, ever-longer pulse trains may be used to simplify the tasks of passive modelocking and output pulse generation. The more times the oscillator resonates, the better the quality of the output pulse it produces.

Figure 2A:
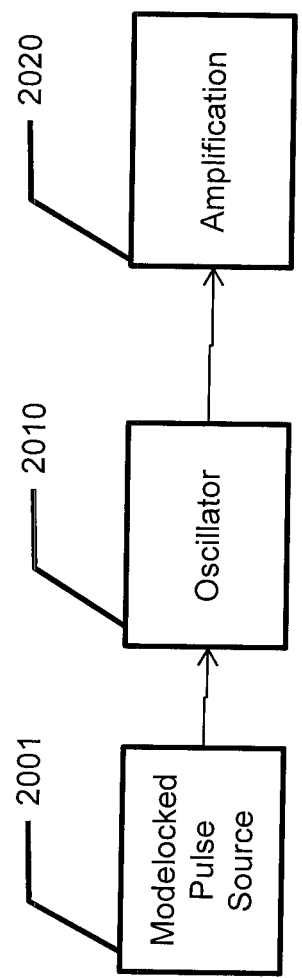
FIG. 2a shows an example of a basic system architecture according to the present invention.

An example of a basic architecture embodying such pulse synchronization for high efficiency OPO-OPA operation is shown in FIG. 2a. In the variation shown, a modelocked optical pulse source 2001 feeds an oscillator 2010 and an amplifier chain 2020. Another variation of such an architecture is shown in FIG. 2b.

Figure 2B:
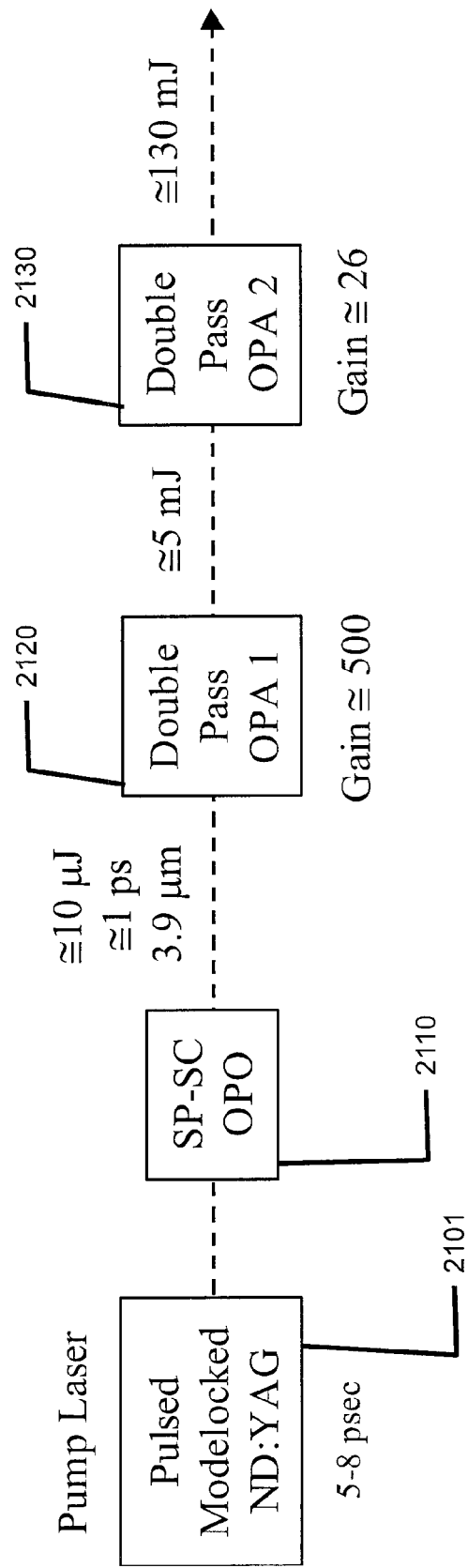
FIG. 2b shows a particular variation of a basic system architecture according to the present invention.

In FIG. 2b, a modelocked picosecond Nd:YAG pulse laser 2101 produces high intensity pulses that are then fed to a synchronously pumped OPO 2110 that performs frequency conversion on the incoming pulses and feeds them to a series of double-pass OPAs 2120 2130. The two OPAs in the amplification chain cause the system of FIG. 2b to generate at 130 mj pulse. In other variations, different types of OPO or OPA may be used, as well as more or fewer OPAs. In the variation shown in FIG. 2b. each OPA 2120 2130 is a double-pass OPA. Other variations may include single-pass or multiple-pass OPAs, or may include three or more OPAs in an amplification chain.

Although the variation shown uses a ND:YAG picosecond laser 2101, other laser types such as modelocked TiSapphire or $Cr^{3+}$:LiSAF may be used as well, which can generate a range of pulse widths and frequencies. Furthermore, although the variation shown depicts a first 2120 and a second 2130 double-pass OPA in the amplifier chain, other variations may use different amplifier types such as Er:Glass or Er:YAG and may also employ more or fewer amplifiers. Amplifier type may be determined by desired wavelengths. An OPA may be preferred for wavelengths such as 3-5 $\mu$m. Variations may generate pulse outputs of high as 10 $GW/cm^2$ or more.

The peak intensity is preferably under the damage threshold for the materials involved. The damage threshold increases as the square root of the pulse width (approximately). Therefore, at a peak intensity of 10 $GW/cm^2$ the output pulse energy in a 1 psec wide pulse could be as high as 0.8 Joules.

One particular feature of the systems shown in FIGS. 2a and 2b is that there no pulse stretcher or compressor involved in the pulse generation/amplification process, making the system cheaper and easier to build and removing a main source of vibrational sensitivity, mis-alignment, and optical damage. As noted above, traditional pulse stretchers and compressors are very large devices having many small components with alignment tolerances on the scale of sub-millimeters. A small pulse stretcher may require up to 8 cubic feet of volume. A pulse stretcher suitable for high-energy, picosecond-class pulses would be even larger. Furthermore, because tolerances for a pulse stretcher are comparable to those for an interferometer, and because alignment requirements are on a scale of sub-millimeters throughout the device, a pulse stretcher is a large, cumbersome, expensive device that is highly sensitive to vibration, dust, and any other potential source of disturbance. It is difficult to configure and keep stable in a lab setting and utterly unfit for use in any kind of field or mobile environment.

Furthermore, there is no femto-second (fs) oscillator required in the systems shown in FIGS. 2a and 2b, further improving system reliability by removing yet another source of vibrational sensitivity. Also, the solution shown above is lighter, cheaper, and more compact, allowing it to be built and configured for mounting on a moving platform such as a vehicle.

In some variations, an entire system may be contained within an enclosure that protects against contamination and/or provides a light-proof environment. In some variations, the components within the enclosure may be further encased in foam or molded materials such that only the beam-paths between components are open space within the enclosure. In other variations, an enclosure might include gyroscopic elements that preserve the alignment of individual system components regardless of orientation or dislocation of the assembly.

The solutions shown in FIGS. 2a and 2b allow for synchronization of the entire laser system to less than one picosecond, thereby allowing short pump pulses to be used in the amplifier chain. This is advantageous because the gain coefficient of the system is proportional to the pump intensity. Short pulses can provide very high intensities. A pulsed modelocked pump laser can therefore be used to drive both the oscillator and amplifiers. The output of the pump laser is a series of pulses that are precisely spaced according to the round trip cavity length of the pump laser.

As noted above, modelocking may be accomplished in any number of ways currently known in the art. The modelocked pulse train may serve as the master oscillator synchronizing the entire laser passively. In some variations, the components inside the laser oscillator causing the system to modelock are the laser gain medium, passive and/or active modelocking components such as a dye cell, Acoustooptic modulator, or a Kerr lens modelocker. In other variations, other components may used for modelocking as well. Modelocking frequencies can range from less than 10 MHz to over 1 GHz. In some variations, the gain bandwidth of a laser material defines its ability to modelock.

In some variations, vibration may impact the ability of a laser to modelock. Pulsed modelocking may work better than CW modelocking in such vibration-sensitive variations because the duration of a single pulse train may be less than the duration of a vibration.

Because a pulse modelocked pump laser 2010 drives the OPO 2110, which pumps both OPAs 2120 2130, the type of system shown in FIG. 2b is self-synchronizing, (i.e. the oscillator and amplifiers are optically locked together because they are fed by the same modelocked pulse train). Temporal jitter is not an issue because any jitter would arise from improper or incorrect measurement of delay lines or optical cavities. The system therefore cannot have its timing easily disturbed or altered once properly configured. Also, the self-synchronizing aspect eliminates a need for a femto-second oscillator, reducing system cost, complexity, weight, and size. Furthermore, because no pulse stretchers or compressors are required, the system is more compact, lighter in weight, lower-cost, and more tolerant of movement and vibration since there are fewer parts susceptible to optical damage or mis-alignment, which makes the system compact and therefore more easily ruggedized and configured for use on a moving platform, such as a vehicle.

Figure 3A:
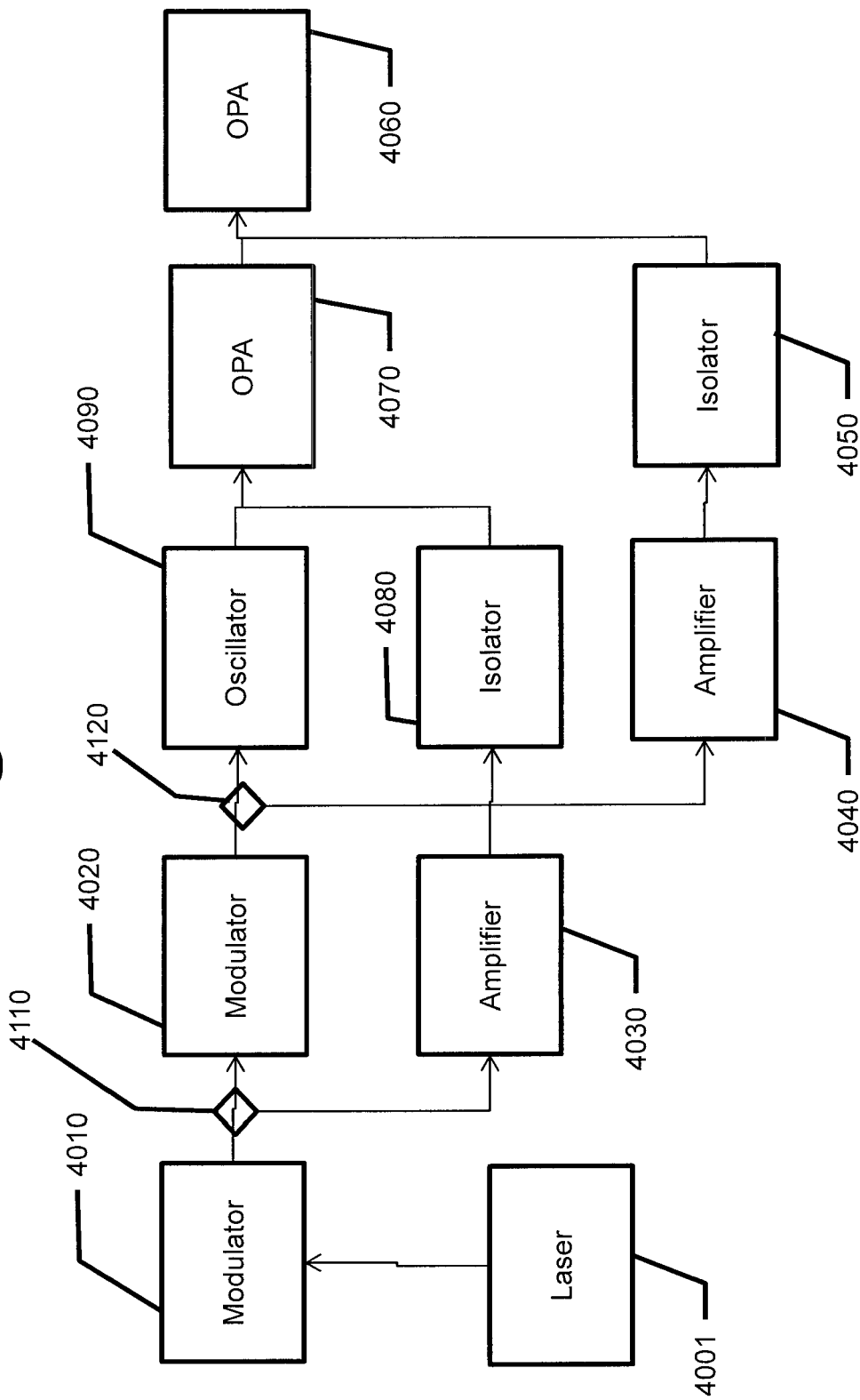
FIG. 3a shows an example of a system architecture according to the present invention.

An example of a compact, vehicle-mountable optically locked laser system configuration of the type discussed herein is shown in FIG. 3a. In the example shown, a pico-second laser source 4001 feeds a modelocked pulse train into a modulator 4010 or pulse picker. Variations of a pico-second laser may include a mode-locked, solid-state bulk laser such as a passively mode-locked Nd:YAG or vanadate laser or a mode-locked fiber laser.

The modulator 4010 or pulse picker may be used to pick pulses from the modelocked pulse train generated by the laser source 4001. In some variations, the modulator 4010 may be a Pockels cell combined with polarizing optics such as a thin-film polarizier. The speed of the modulator 4010 may be determined by the pulse repetition rate of the laser source 4001 and, in some cases, also by the pulse duration. In the variation shown, a beam splitter 4110 separates the pulse train coming from the first modulator 4010 into two portions, with one portion entering a subsequent modulator 4020 and another portion entering a laser amplifier 4030. The subsequent modulator 4020 may be used in a fashion similar to the first modulator 4010 and its output may also feed a beam splitter 4120.

In some variations, the beam splitters 4120 4110 may be configurable or selectively activated in conjunction with the modulators 4010 4020. Such splitters may direct the pulses selected by the modulators 4010 4020 for amplification in the OPA to the amplifiers 4030 4040 while allowing the other pulses in the modelocked pulse train provided by the laser source 4001 to drive the oscillator 4090. In some variations, the beam splitters 4110 4120 may be incorporated into or replaced with selective and/or selectively activated reflectors. Such reflectors may direct a selected pulse, as identified by the modulator 4010, to either the oscillator 4090 or an appropriate amplifier 4040 4030.

The laser amplifier 4030 may be a semiconductor optical amplifier, an Nd:YAG amplifier, a fiber amplifier, or any other type of amplifier based on a gain medium. The amplifier may be connected to an optical parametric amplifier (OPA) 4070 via an optical isolator 4080. The optical isolator 4080 helps prevent optical feedback from the OPA 4070 back into the amplifier 4030.

Each pulse in the train of pulses is preferably at a low energy, in some cases less than 1 mJ. Such levels are typically not sufficient to pump an OPA but may be enough to pump an OPO because many pulses are used to resonate the OPO. Pumping an OPA single or double pass is preferably done with energetic pulses, which may be generated by passing the pulses from the pulse train through a laser amplifier 4030.

The pulse exiting the second modulator 4020 may also be selected to be split 4120 or otherwise fed into a laser amplifier 4040 that then passes an amplified pulse to another OPA 4060 via another optical isolator 4050. In some variations, the optical isolators 4080 4050 may be faraday isolators or other polarization-based optical isolators. The pulses not selected for laser amplification 4030 4040 by the modulators 4020 4010 may be fed to the oscillator 4090 which provides efficient phase matching for the OPAs 4070 4060. Preferably the oscillator 4090 is an OPO. Variations may use continuous-wave OPOs, singly-resonant OPOs, synchronously pumped OPOs, and fiber feedback OPOs.

Figure 3B:
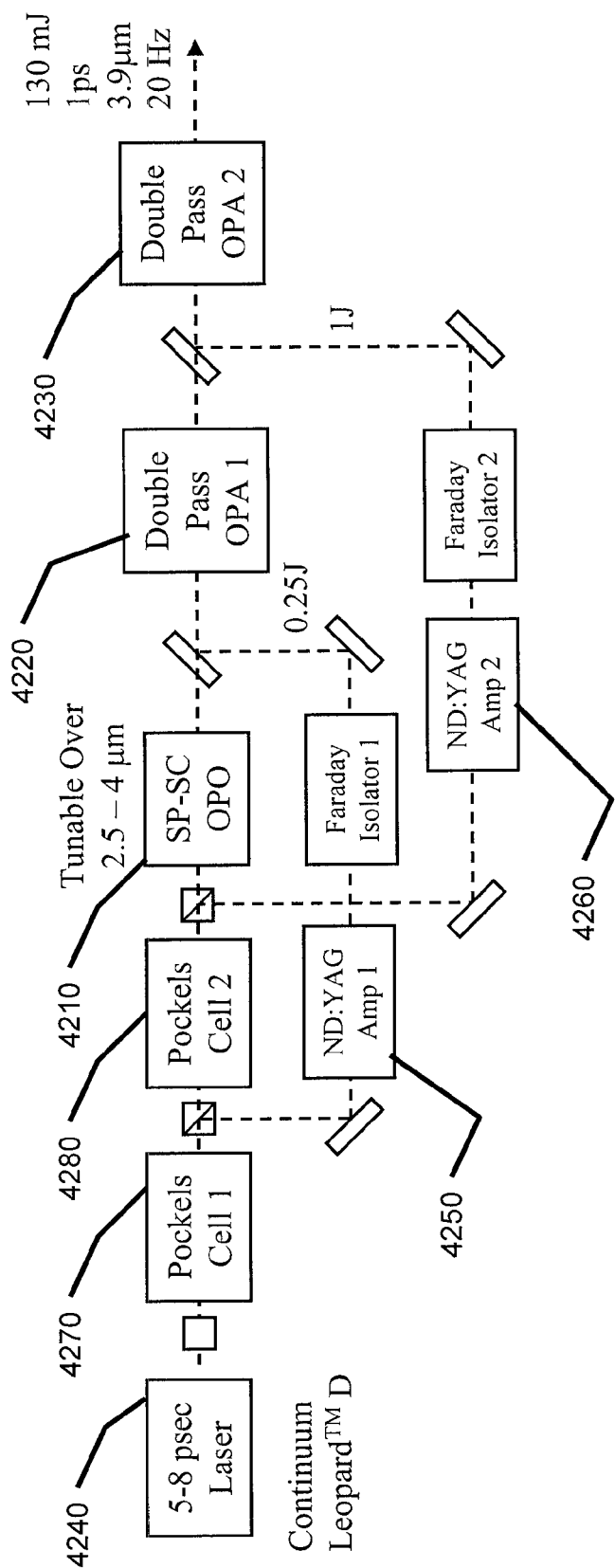
FIG. 3b shows a particular variation of a system architecture according to the present invention.

A specific variation of the arrangement above is depicted in FIG. 3b. As can be seen from the figure, a tunable, synchronously pumped OPO 4210 is used to provide phase matching for two double-pass OPAs 4220 4230 based on a 5 to 8 pico-second Nd:YAG modelocked pulse laser source 4240. Pockels cells 4270 4280 are used as pulse pickers to select two pulses from the modelocked pulse train and send each to an Nd:YAG laser amplifier 4250 4260 that feeds its respective pulse to one of the OPAs 4220 4230. The output, in such an arrangement, is a 130 mJ, 1 pico-second output pulse. Although the system of FIG. 3b is shown using reflectors to create optical paths, other variations may use prisms or fiber-optics to accomplish similar optical path creation and/or isolation.

As can be appreciated from FIGS. 3a and 3b, the system accomplishes high-energy, pico-second pulse output without using pulse stretching or compression and also without an electronic oscillator. Such a system may be assembled inside a ruggedized casing small enough to fit into the bed of a small pickup truck, or approximately three cubic feet in volume or less. In some variations, very small volumes may be realized by removing some or all of the empty space between components. By contrast, a laser system using a stretcher and compressor would add more than 10 ft$^3$ of volume. They would also make the system incredibly sensitive to environmental conditions (dust, humidity, vibrations, temperature.)

Only exemplary embodiments of the present invention are shown and described in the present disclosure. It is to be understood that the present invention is capable of use in various other combinations and environments and is capable of changes or modifications within the scope of the inventive concept as expressed herein. Such variations are not to be regarded as departure from the spirit and scope of the invention, and all such modifications as would be obvious to one skilled in the art are intended to be included within the scope of the following claims:

The invention claimed is:

1. An optically locked high-energy self-synchronizing laser amplification system, the system comprising:
   a modelocked laser source configured to emit a plurality of pulses along an optical path;
   an optical parametric oscillator (OPO) in the optical path configured to generate an output pulse in response to some of the plurality of pulses;
   a first pulse picker disposed in the optical path downstream of the modelocked laser source and upstream of the OPO that is configured to select a first selected pulse of the plurality of pulses for diversion from the optical path to a first bypass optical path that bypasses the OPO;
   a first laser amplifier in the first bypass optical path configured to amplify the first selected pulse to generate an amplified first selected pulse;
   a first reflector configured to reflect the amplified first selected pulse toward a first beam combiner;
   the first beam combiner configured to combine the amplified first selected pulse with the output pulse to generate a first combined pulse; and
   a first optical parametric amplifier (OPA) configured to receive the first combined pulse and to generate an amplified first combined pulse.

2. The system of claim 1, wherein the OPO is configured to receive the plurality of pulses from the modelocked laser source unamplified.

3. The system of claim 1, wherein the modelocked laser source is a pico-second laser.

4. The system of claim 1, wherein the first OPA is a double-pass OPA.

5. The system of claim 1, further comprising:
   a second pulse picker disposed in the optical path downstream of the modelocked laser source and upstream of the OPO that is configured to select a second selected pulse of the plurality of pulses for diversion from the optical path to a second bypass optical path that bypasses the OPO;
   a second laser amplifier in the second bypass optical path configured to amplify the second selected pulse to generate an amplified second selected pulse;
   a second reflector configured to reflect the amplified second selected pulse toward a second beam combiner;
   the second beam combiner configured to combine the amplified second selected pulse with the amplified first combined pulse to generate a second combined pulse; and
   a second OPA configured to receive the second combined pulse and to generate an amplified second combined pulse.

6. The system of claim 5, further comprising a first optical isolator between the first laser amplifier and the first reflector.

7. The system of claim 5, where the first pulse picker includes a Pockels cell.

8. The system of claim 1, where the modelocked laser source is an Nd:YAG pico-second laser.

9. The system of claim 1, where the OPO is a tunable, synchronously-pumped OPO.

10. The system of claim 9, where the first laser amplifier is an Nd:YAG amplifier.

11. The system of claim 1, the system further comprising a ruggedized housing enclosing the optical components, the housing being configured to protect the optical components from mis-alignment, vibration, and external contaminants and also for mounting on a vehicle.

12. A method of generating a high-energy, mid-wave, ultra-short laser pulse, the method comprising:
    providing a pulse sequence comprising a plurality of pulses from a modelocked laser source along an optical path;
    driving an optical parametric oscillator (OPO) with some of the plurality of pulses to generate an output pulse in response to the some of the plurality of pulses;
    diverting, downstream of the modelocked laser source and upstream of the OPO, a first selected pulse of the plurality of pulses from the optical path to a first bypass optical path that bypasses the OPO;
    amplifying, in the first bypass optical path, the first selected pulse to generate an amplified first selected pulse;
    combining, in the optical path, the amplified first selected pulse with the output pulse to generate a first combined pulse; and
    receiving, by a first optical parametric amplifier (OPA), the first combined pulse to generate an amplified first combined pulse.

13. An optically locked high-energy self-synchronizing laser amplification system, the system comprising:
    a modelocked laser source;
    a first Pockels cell in optical communication with the modelocked laser source;
    a first beam splitter in optical communication with the first Pockels cell, such that the first Pockels cell is disposed in an optical path between the beam splitter and the modelocked laser source;
    a second Pockels cell in optical communication with the first beam splitter such that the first beam splitter is disposed in an optical path between the first and second Pockels cells;
    a second beam splitter in optical communication with the second Pockels cell such that the second Pockels cell is disposed in an optical path between the first and second beam splitters;
    a tunable optical parametric oscillator (OPO) in optical communication with the second beam splitter such that the second beam splitter is disposed in an optical path between the second Pockels cell and the OPO;
    a first laser amplifier in optical communication with the first beam splitter such that the first beam splitter is disposed in an optical path between the first laser amplifier and the first Pockels cell;
    a first Faraday isolator in optical communication with the first laser amplifier such that the first laser amplifier is disposed in an optical path between the first beam splitter and the first Faraday isolator;
    a second laser amplifier in optical communication with the second beam splitter such that the second beam splitter is disposed in an optical path between the second laser amplifier and the second Pockels cell;
    a second Faraday isolator in optical communication with the second laser amplifier such that the second laser amplifier is disposed in an optical path between the second beam splitter and the second Faraday isolator;
    a first optical parametric amplifier (OPA) in optical communication with the OPO and the first Faraday isolator such that the OPO is disposed in an optical path between the second beam splitter and the first OPA and such that the first Faraday isolator is disposed in an optical path between the first OPA and the first laser amplifier; and
    a second OPA in optical communication with the first OPA and the second Faraday isolator such that the first OPA is disposed in an optical path between the OPO and the second OPA and such that the second Faraday isolator is disposed in an optical path between the second OPA and the second laser amplifier.

14. The laser amplification system of claim 13, where at least one OPA is a multiple-pass OPA.

15. The laser amplification system of claim 13, where:
the modelocked laser source generates pulses having a length of between 5 and 8 pico-seconds, inclusive;
the OPO is tunable over 2.5 to 4 microns; and
the first and second laser amplifiers are Nd:YAG amplifiers; and
where the system further comprises a light-proof housing enclosing the optical components, the housing being configured to protect the optical components from misalignment, vibration, dust and external contaminants and also for mounting on a vehicle.

16. The method of claim 12, further comprising:
diverting, downstream of the modelocked laser source and upstream of the OPO, a second selected pulse of the plurality of pulses from the optical path to a second bypass optical path that bypasses the OPO;
amplifying, in the second bypass optical path, the second selected pulse to generate an amplified second selected pulse;
combining, in the optical path, the amplified second selected pulse with the amplified first combined pulse to generate a second combined pulse; and
receiving, by a second OPA, the second combined pulse to generate an amplified second combined pulse.

* * * * *